US009329829B2

(12) United States Patent
Yu et al.

(10) Patent No.: US 9,329,829 B2
(45) Date of Patent: May 3, 2016

(54) SYNCHRONOUS DISPLAY METHOD OF SPLICED DISPLAY SCREEN, AND TIMING CONTROLLER AND SPLICED DISPLAY SCREEN USING THE SAME (71) Applicants: BOE TECHNOLOGY GROUP CO., LTD., Beijing (CN); BEIJING BOE DISPLAY TECHNOLOGY CO., LTD., Beijing (CN)

(72) Inventors: Yangbing Yu, Beijing (CN); Weihao Hu, Beijing (CN); Yoon Dae Keun, Beijing (CN); Yanping Liao, Beijing (CN); Xibin Shao, Beijing (CN); Lei Liu, Beijing (CN); Zongze He, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 36 days.

(21) Appl. No.: 14/316,182

(22) Filed: Jun. 26, 2014

(65) Prior Publication Data
US 2015/0234631 A1   Aug. 20, 2015

(30) Foreign Application Priority Data

Feb. 20, 2014   (CN) .......................... 2014 1 0058868

(51) Int. Cl.
G09G 5/00 (2006.01)
G06F 3/14 (2006.01)
G06T 1/20 (2006.01)
G09G 5/18 (2006.01)
G09G 5/12 (2006.01)

(52) U.S. Cl.
CPC ............ *G06F 3/1446* (2013.01); *G06F 3/1438* (2013.01); *G06T 1/20* (2013.01); *G09G 5/003* (2013.01); *G09G 5/008* (2013.01); *G09G 5/12* (2013.01); *G09G 5/18* (2013.01)

(58) Field of Classification Search
USPC .............................. 345/1.1, 1.3, 204, 211, 213
See application file for complete search history.

(56) References Cited

U.S. PATENT DOCUMENTS

| 2006/0170823 A1* | 8/2006 | FanChiang | G09G 5/008 348/536 |
| 2011/0199368 A1* | 8/2011 | Huang | G09G 3/20 345/213 |
| 2012/0013343 A1* | 1/2012 | Washizu | G01R 31/31922 324/537 |
| 2013/0050158 A1* | 2/2013 | Yang | G09G 5/12 345/204 |

FOREIGN PATENT DOCUMENTS

| CN | 101815177 A | 8/2010 |
| CN | 102422173 A | 4/2012 |
| CN | 103297707 A | 9/2013 |
| JP | 05167439 A | 7/1993 |

OTHER PUBLICATIONS

The First Office Action for CN Application No. 20140058868.7, Dated Jul. 10, 2015, 7 pages.

* cited by examiner

*Primary Examiner* — Jason Olson
*Assistant Examiner* — Sosina Abebe
(74) *Attorney, Agent, or Firm* — Kinney & Lange, P.A.

(57) ABSTRACT

The disclosure provides a synchronous display method of an spliced display screen which comprises at least two spliced display units and at least two timing controllers respectively corresponding to the spliced display units, wherein the method comprises steps of: receiving, by each timing controller, a timing control signal for a current frame of the corresponding spliced display unit, feedback from the spliced display unit corresponding to the timing controller; determining, by each timing controller, a phase difference between the timing control signal for the current frame of the corresponding spliced display unit and a reference timing control signal received by the timing controller; judging, by each timing controller, whether or not the phase difference goes beyond a predetermined threshold range; if it is judged that the phase difference goes beyond the predetermined threshold range, generating a phase adjustment value, by the timing controller, based on the phase difference, wherein the phase adjustment value is less than the phase difference; generating, by each timing controller, a next timing control signal for a next frame of the corresponding spliced display unit, based on the phase adjustment value, so that a next phase difference between the next timing control signal for the next frame and the reference timing control signal is the phase adjustment value; and outputting the next timing control signal for the next frame to the corresponding spliced display unit. Meanwhile, the disclosure also provides a timing controller used in this synchronous display method and a spliced display screen to which this synchronous display method is applied.

10 Claims, 5 Drawing Sheets

SYNCHRONOUS DISPLAY METHOD OF SPLICED DISPLAY SCREEN, AND TIMING CONTROLLER AND SPLICED DISPLAY SCREEN USING THE SAME

CROSS-REFERENCE TO RELATED APPLICATION

This application claims the benefit of Chinese Patent Application No. 201410058868.7 filed on Feb. 20, 2014 in the State Intellectual Property Office of China, the whole disclosure of which is incorporated herein by reference.

BACKGROUND OF THE INVENTION

1. Field of the Invention

Embodiments of the present invention relate to display technology, and more particularly, to a synchronous display method for a spliced display screen, and, a timing controller and a spliced display screen using this method.

2. Description of the Related Art

With the development of the liquid crystal display technology, a large screen liquid crystal display TV wall is widely used in large-scale activities due to its good visual shock and clear effect. Splicing technology, in which multiple displays (spliced display units) are spliced into an spliced display screen and these spliced display units display different parts of a picture simultaneously to achieve a large screen display in the spliced display screen, is widely adopted because these large or super-large screen liquid crystal display TV walls are difficult to produce directly and have very high production cost. In order to achieve a large screen display in the spliced display screen and ensure synchronization among these spliced display units, it is required that phases in the timing control signals provided to these spliced display units are synchronous with each other.

Figure 1:
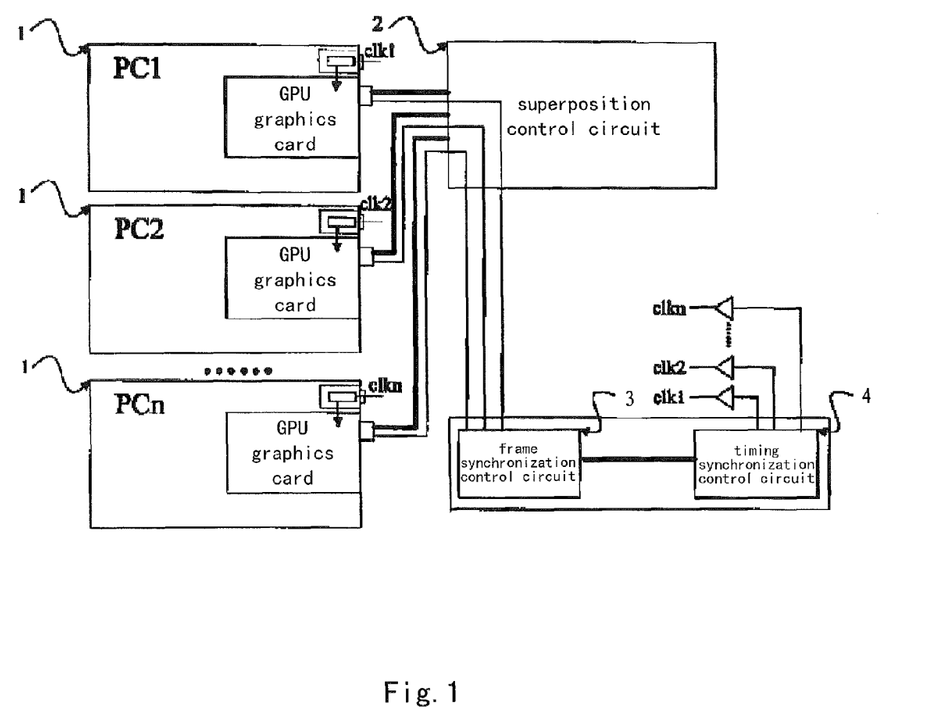
FIG. 1 is a structural schematic view of a conventional synchronous display device.

At present, a synchronous display device used in the conventional spliced display screen is shown in FIG. 1, in which each of display signal output units 1 sends a display signal containing a timing control signal to a superposition control circuit 2, a frame synchronization control circuit 3 selects or assigns one of these display signal output units 1 as a predetermined display signal output unit, and, a timing control signal from which is used as a reference timing control signal. Further, the frame synchronization control circuit 3 measures arrival times of the reference timing control signal and the remaining timing control signals from other display signal output units 1, so as to achieve time delays between the arrival times of the timing control signals of the other display signal output units 1 and that of the reference timing control signal; and then, based on the time delays, the frame synchronization control circuit 3 sends adjustment instructions to a timing synchronization control circuit 4. With these received instructions, the timing synchronization control circuit 4 adjusts timing output channels corresponding to these display signal output units 1 such that arrival times of the timing control signals in these display signal output units 1 are synchronous with each other.

However, in the above synchronous display device, once time delays between the arrival times of the timing control signals of the remaining display signal output units and that of the reference timing control signal are relatively greater, adjustments for synchronizing the timing control signals of the remaining display signal output units with that of the reference timing control signal may lead to signal jumps, which cause frame flicker phenomenon in the spliced display units, thereby affecting the display effect. Furthermore, comparisons and adjustments of the timing control signals of the remaining display signal output units with that of the reference timing control signal before displaying of each frame may causes high possibility of signal jumps, thereby further aggravating the frame flicker phenomenon in the spliced display units.

SUMMARY OF THE INVENTION

In view of the above, at least one object of the present invention is to provide a synchronous display method for an spliced display screen, which is adapted to reduce possibility of frame flicker on the conventional spliced display screen.

Another object of the present invention is to provide a timing controller used in the abovementioned synchronous display method of an spliced display screen, which is adapted to reduce possibility of frame flicker on the conventional spliced display screen.

Still another object of the present invention is to provide a spliced display screen using the abovementioned synchronous display method, which is adapted to reduce possibility of frame flicker on the conventional spliced display screen.

According to an embodiment of one aspect of the present invention, there is provided asynchronous display method of a spliced display screen which comprises at least two spliced display units and at least two timing controllers respectively corresponding to the spliced display units, the method comprising steps of:

receiving, by each timing controller, a timing control signal for a current frame of a spliced display unit corresponding to the timing controller, fed back from the corresponding spliced display unit;

determining, by each timing controller, a phase difference between the timing control signal for the current frame of the corresponding spliced display unit and a reference timing control signal received by the timing controller;

judging, by each timing controller, whether or not the phase difference goes beyond a predetermined threshold range;

if it is judged that the phase difference goes beyond the predetermined threshold range, generating a phase adjustment value by each timing controller based on the phase difference, wherein the phase adjustment value is less than the phase difference;

generating, by each timing controller, a next timing control signal for a next frame of the corresponding spliced display unit based on the phase adjustment value, so that a next phase difference between the next timing control signal for the next frame and the reference timing control signal is equal to the phase adjustment value; and outputting the next timing control signal for the next frame to the corresponding spliced display unit.

According to an embodiment of a further aspect of the present invention, there is provided a timing controller for use in a spliced display screen, the timing controller comprising:

a receiving unit configured to receive a timing control signal for a current frame of a spliced display unit of the spliced display screen corresponding to the timing controller feedback from the spliced display unit, and a reference timing control signal;

a first processing unit configured to determine a phase difference between the timing control signal for the current frame of the corresponding spliced display unit and the reference timing control signal received by the receiving unit;

a second processing unit configured to judge whether or not the phase difference goes beyond a predetermined threshold range;

a third processing unit configured to, if it is judged that the phase difference goes beyond the predetermined threshold range, generate a phase adjustment value based on the phase difference, wherein the phase adjustment value is less than the phase difference;

a fourth processing unit configured to generate a next timing control signal for a next frame of the corresponding spliced display unit based on the phase adjustment value, so that a next phase difference between the next timing control signal for the next frame and the reference timing control signal is equal to the phase adjustment value; and a sending unit configured to output the next timing control signal for the next frame to the corresponding spliced display unit.

According to an embodiment of a still further aspect of the present invention, there is provided a spliced display screen comprising at least two spliced display units and at least two abovementioned timing controllers corresponding respectively to the spliced display units.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

Referring to FIGS. 2-5, according to a generally inventive concept of the present invention, a synchronous display method of a spliced display screen and a timing controller and a spliced display screen applied in this method according to embodiments of the present invention will be described hereinafter in detail with reference to the drawings.

Figure 2:
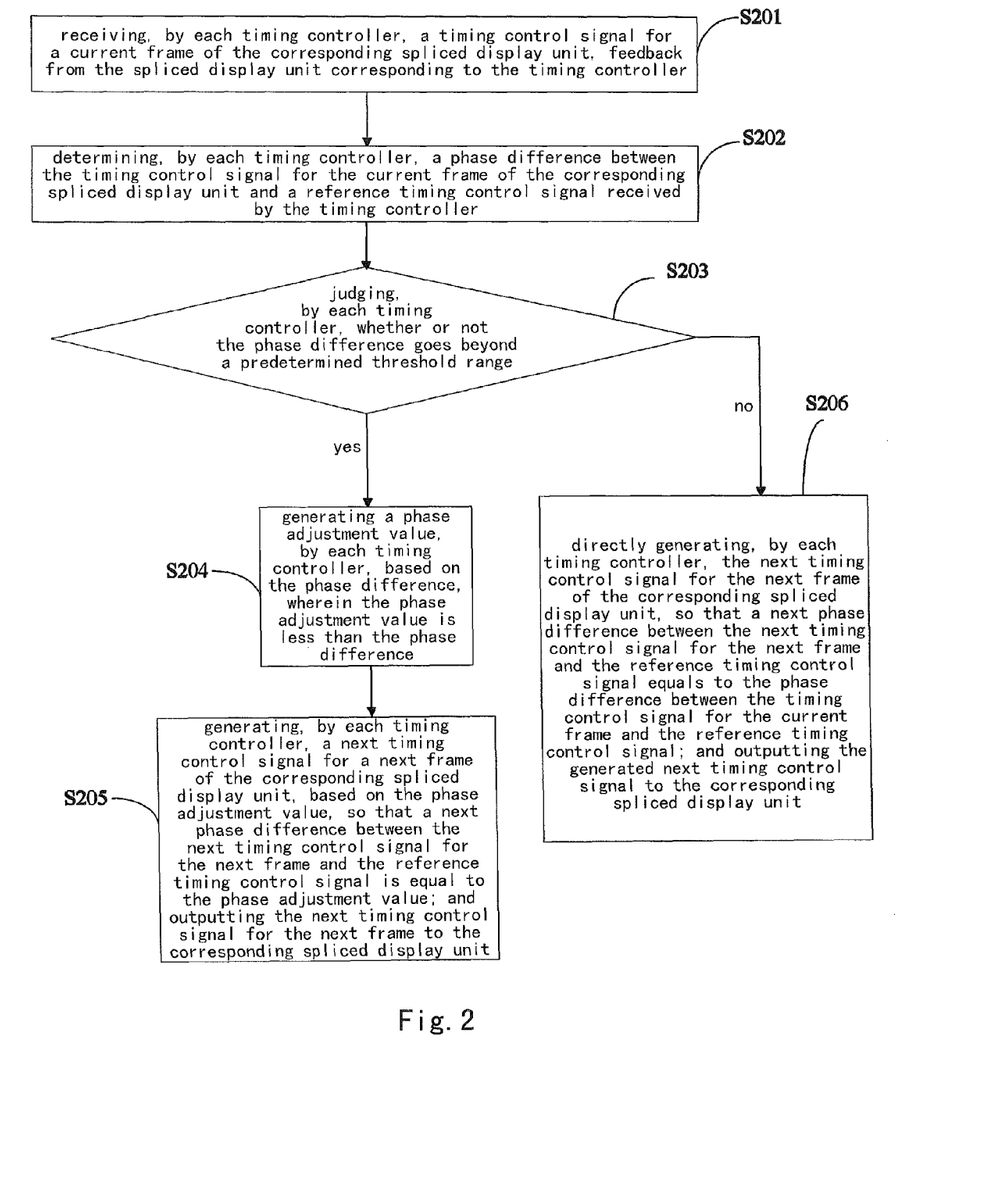
FIG. 2 is a flow chart of a synchronous display method of a spliced display screen according to an embodiment of the present invention.
Figure 5:
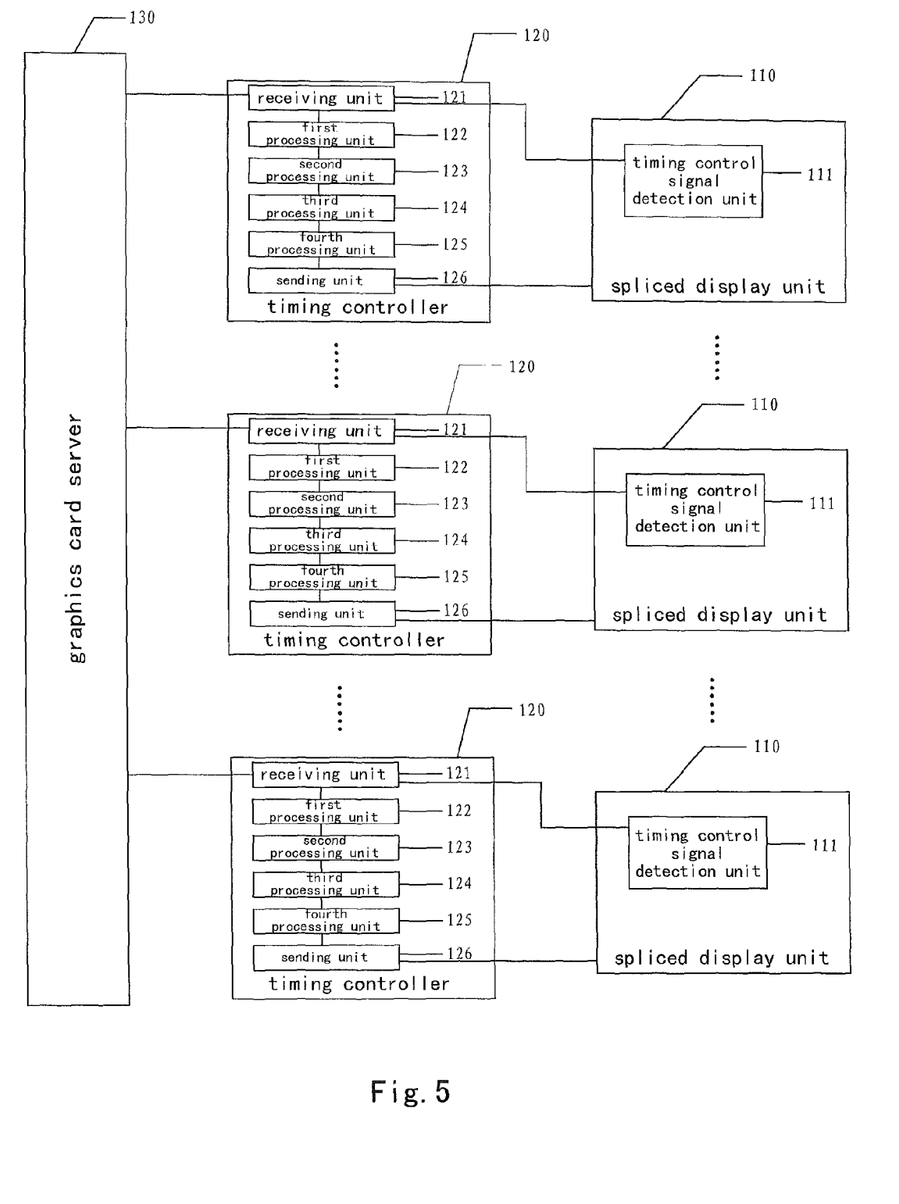
FIG. 5 is a structural schematic view of a spliced display screen according to an embodiment of the present invention.

According to an embodiment of the present invention, there provides a synchronous display method of a spliced display screen. As shown in FIG. 5, the spliced display screen may comprise at least two spliced display units 110, at least two timing controllers 120 respectively corresponding to the spliced display units 110, and a graphics server 130. As shown in FIG. 2, the synchronous display method may comprise the following steps of:

S201): receiving, by each timing controller, a timing control signal for a current frame of the corresponding spliced display unit, feedback from the spliced display unit corresponding to the timing controller; and S202): determining, by each timing controller, a phase difference between the timing control signal for the current frame of the corresponding spliced display unit and a reference timing control signal received by the timing controller;

S203): judging, by each timing controller, whether or not the phase difference goes beyond a predetermined threshold range, wherein if it is judged that the phase difference goes beyond the predetermined threshold range, carrying out the following step of S204), S204): generating a phase adjustment value, by each timing controller, based on the phase difference, wherein the phase adjustment value is less than the phase difference; and S205): generating, by each timing controller, a next timing control signal for a next frame of the corresponding spliced display unit, based on the phase adjustment value, so that a next phase difference between the next timing control signal for the next frame and the reference timing control signal is equal to the phase adjustment value; and outputting the next timing control signal for the next frame to the corresponding spliced display unit.

Figure 4:
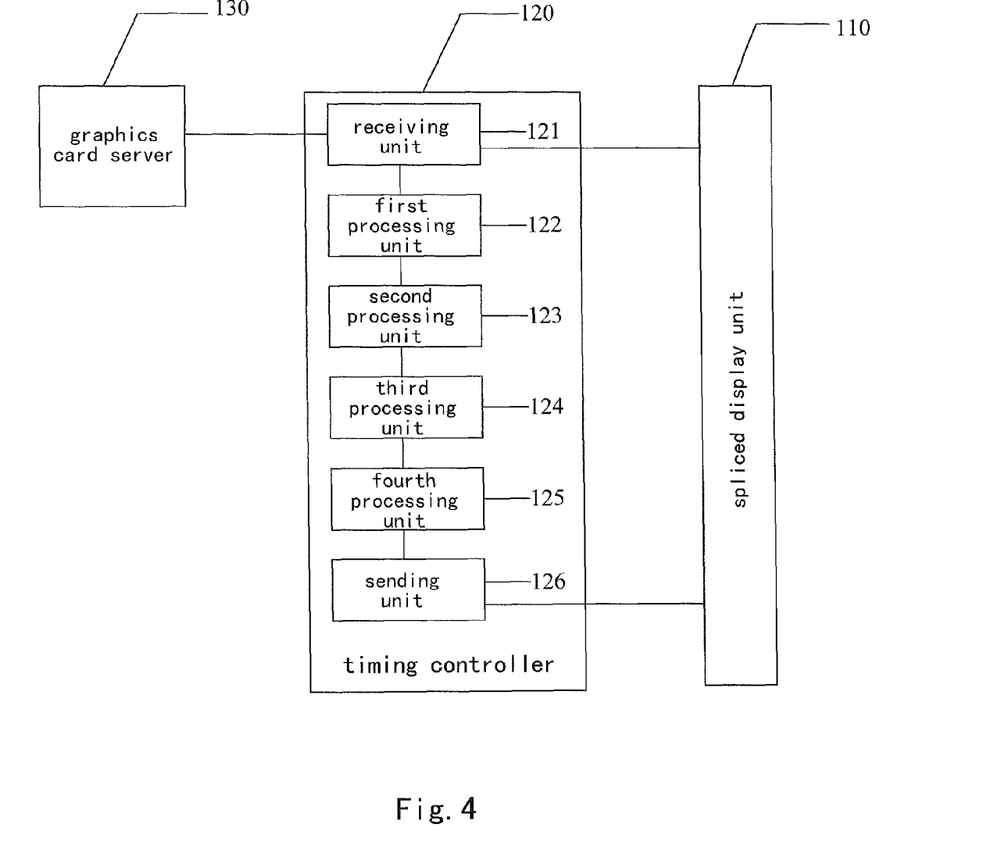
FIG. 4 is a structural schematic view of a timing controller according to an embodiment of the present invention.

In particular, in one embodiment of the abovementioned method, the reference timing control signals received by these timing controllers 120 can be sent by the graphics server 130 of the spliced display screen 110, as shown in FIG. 4. Of course, in other embodiments, it may be sent by other devices having such function, and the present invention is not limited to this.

Further, for these timing controllers 120, the receiving of the reference timing control signal may be prior to the receiving of the timing control signal for the current frame. Of course, in other embodiments, the receiving of the reference timing control signal and the receiving of the timing control signal for the current frame may be carried out at the same time, and the present invention is not limited to this.

In addition, in the abovementioned method, the reference timing control signal can be the timing control signal for the current frame of the spliced display unit 110, feedback from the spliced display unit corresponding to any one of the timing controllers 120.

Accordingly, these steps of the abovementioned synchronous display method are repeated during the displaying of each frame. By several adjustments, the phase difference between the timing control signal for the current frame of the spliced display unit and the reference timing control signal is gradually reduced, till this phase difference falls into the predetermined threshold range, thereby achieving the synchronous displaying of the spliced display screen.

Preferably, in one embodiment, the step S204) of generating the phase adjustment value may further comprise: obtaining the phase adjustment value by multiplying the phase difference by a predetermined coefficient which is greater than zero but less than 1. Of course, in other embodiments of the abovementioned method, the phase adjustment value can be obtained by dividing the value of the phase difference by a value larger than 1, provided that the generated phase adjustment value is less than the phase difference.

Preferably, in one embodiment, the phase adjustment value is a half of the phase difference. In particular, it can be obtained by multiplying the value of the phase difference by 0.5, or else, it can be obtained by dividing the value of the phase difference by 2. Of course, in other embodiments, the predetermined coefficient can be other coefficient, and the present invention is not limited to this.

Preferably, in one embodiment of the abovementioned method, if it is judged that the phase difference between the timing control signal for the current frame of the corresponding spliced display unit and a reference timing control signal received by the corresponding timing controller is within the predetermined threshold range, as shown in FIG. 2, the method may further comprise the following step of:

S206): directly generating, by each timing controller, the next timing control signal for the next frame of the corresponding spliced display unit, so that a next phase difference between the next timing control signal for the next frame and the reference timing control signal equals to the phase difference between the timing control signal for the current frame and the reference timing control signal; and outputting the generated next timing control signal to the corresponding spliced display unit.

Figure 3:
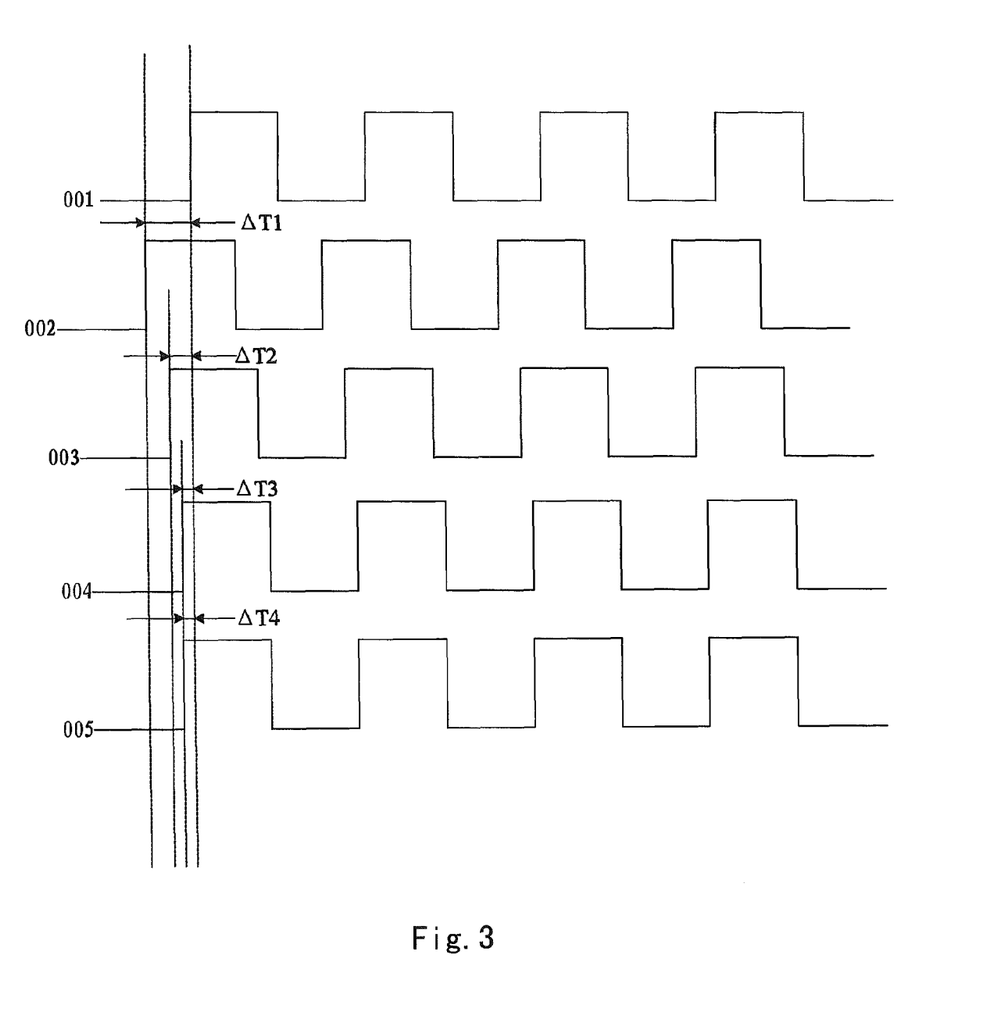
FIG. 3 is a work principle view of the synchronous display performed by a timing controller in the synchronous display method according to an embodiment of the present invention.

The abovementioned synchronous display method according to an embodiment of the present invention will be described hereinafter provided that the phase adjustment value is a half of the phase difference. Referring to FIG. 3, assumed that the phase difference between the timing control signal 002 for the current frame of the corresponding spliced display unit and a reference timing control signal is $\Delta T1$ and $\Delta T1$ goes beyond the predetermined threshold range, and the next phase difference between the next timing control signal 003 for the next frame and the reference timing control signal 001 is $\Delta T2$, and, $\Delta T2=\frac{1}{2}\Delta T1$. When the next timing control signal 003 for the next frame is again feedback from the spliced display unit to the timing controller, without considering the signal attenuation, the phase difference between a timing control signal 004 for a frame after the next frame and a reference timing control signal is $\Delta T3$, $\Delta T3=\frac{1}{2}\Delta T2=\frac{1}{4}\Delta T1$. If $\Delta T3$ falls into the predetermined threshold range, as shown in FIG. 3, then, the timing control signal 004 is used as a timing control signal 005 for another frame of the corresponding spliced display unit after the frame corresponding to the timing control signal 004, and, another next phase difference between the timing control signal 005 for another frame after the next frame and the reference timing control signal is $\Delta T4$, which equals to $\Delta T3$. If $\Delta T3$ goes beyond the predetermined threshold range, then, the phase difference between a timing control signal for every frame after the next frame and a reference timing control signal is gradually reduced, till this phase difference falls into the predetermined threshold range, thereby achieving the synchronous displaying.

Specifically, since there is a certain distance between the timing controller and the corresponding spliced display unit, some signal attenuations will occur on the timing control signals transmitted from each timing controller to the corresponding spliced display unit and these signal attenuations vary to different extents. Accordingly, in one embodiment of the abovementioned method, in order to eliminate the non-synchronous displaying caused by these varied signal attenuations, it is preferably to dispose a timing control signal detection unit within a display panel in each spliced display unit of the spliced display screen.

In one embodiment, the step of receiving, by each timing controller, a timing control signal for the current frame of the corresponding spliced display unit, feedback from the spliced display unit corresponding to the timing controller, may further comprise:

receiving, by each timing controller, the timing control signal for the current frame of the corresponding spliced display unit, feedback from the timing control signal detection unit disposed within the display panel of the spliced display unit corresponding to the timing controller.

According to the same inventive concept of the present invention, there provides a timing controller 120, which is used in the spliced display screen, according to embodiments of the present invention. Referring to FIG. 4, the timing controller comprises:

a receiving unit 121 configured to receive a timing control signal for a current frame of the corresponding spliced display unit 110 feedback from the spliced display unit corresponding to the timing controller 120, and a reference timing control signal;

a first processing unit 122 configured to determine a phase difference between the timing control signal for the current frame of the corresponding spliced display unit 110 and a reference timing control signal received by the receiving unit 121;

a second processing unit 123 configured to judge whether or not the phase difference between the timing control signal for the current frame of the corresponding spliced display unit 110 and the reference timing control signal goes beyond a predetermined threshold range;

a third processing unit 124 configured to, if it is judged that the phase difference between the timing control signal for the current frame of the corresponding spliced display unit 110 and the reference timing control signal goes beyond the predetermined threshold range, generate a phase adjustment value based on the phase difference, wherein the phase adjustment value is less than the phase difference;

a fourth processing unit 125 configured to generate a next timing control signal for a next frame of the corresponding spliced display unit, based on the phase adjustment value, so that a next phase difference between the next timing control signal for the next frame and the reference timing control signal is equal to the phase adjustment value; and a sending unit 126 configured to output the next timing control signal for the next frame to the corresponding spliced display unit 110.

Preferably, in order to facilitate the implementation, in the timing controller according to embodiments of the present invention, the third processing unit 124 may be further configured to, if it is judged that the phase difference between the received timing control signal for the current frame of the corresponding spliced display unit and the reference timing control signal goes beyond the predetermined threshold range, generate the phase adjustment value by multiplying the phase difference by a predetermined coefficient which is greater than zero but less than 1.

In particular, in these practical implementations, the predetermined coefficient may be 0.2, 0.5, 0.7, 0.8, or the likes, and the present invention is not limited to these. Preferably, the predetermined coefficient is 0.5.

Preferably, in the abovementioned timing controller according to embodiments of the present invention, the fourth processing unit 125 may be further configured to, if it is judged that the phase difference between the received timing control signal for the current frame of the corresponding spliced display unit and the reference timing control signal is within the predetermined threshold range, directly generate the next timing control signal for the next frame of the corresponding spliced display unit, so that a next phase difference between the next timing control signal for the next frame and the reference timing control signal equals to the phase difference between the timing control signal for the current frame and the reference timing control signal.

According to the same inventive concept of the present invention, referring to FIG. 5, there is provided a spliced display screen comprising at least two spliced display units 110 and at least two timing controllers 120 corresponding to the spliced display units 110 respectively.

Specifically, in these practical implementations, since there is a certain distance between each timing controller and the corresponding spliced display unit, some signal attenuations will occur on the timing control signals transmitted from each timing controller to the corresponding spliced display unit and these signal attenuations vary to different extents. Accordingly, in one embodiment of the abovementioned method, in order to eliminate the non-synchronous displaying caused by these varied signal attenuations, it is preferably to dispose a timing control signal detection unit 111 within a display panel in each spliced display unit of the spliced display screen. The timing control signal detection unit 111 is configured to detect the timing control signal for the current frame of each spliced display unit 110, and to send the timing control signal for the current frame of the spliced display unit 110 to its corresponding timing controller 120.

Preferably, in order to not affect the aperture ratio of each spliced display unit, in the abovementioned spliced display screen according to embodiments of the present invention, the display panel of each spliced display unit comprises a transmittance region and a shading region, and the timing control signal detection unit is disposed in the shading region.

Concerning the above, with the uses of the synchronous display method of a spliced display screen, the timing controller and the spliced display screen according to embodiments of the present invention, when a phase difference between the timing control signal for a current frame of a spliced display unit and a reference timing control signal received by a corresponding timing controller goes beyond a predetermined threshold range, a phase adjustment value which is less than the phase difference is generated, and based on the phase adjustment value, a next timing control signal for a next frame of the spliced display unit is generated, so that a next phase difference between the next timing control signal for the next frame and the reference timing control signal is equal to the phase adjustment value. Through comparisons and adjustments on the timing control signals which would be outputted to these spliced display units gradually, the phase difference between the timing control signal for the current frame of the spliced display unit and the reference timing control signal is gradually reduced, and finally, falls into the predetermined threshold range, thereby achieving the synchronous displaying of the spliced display screen. Furthermore, in this synchronous display method, the next timing control signal for the next frame is generated based on the phase adjustment value that is less than the phase difference between the timing control signal for the current frame and the reference timing control signal, and thus when a phase difference between the timing control signal for the current frame of the spliced display unit and the reference timing control signal is larger, the phase difference between the next timing control signal for the next frame and the timing control signal for the current frame can be generated to be less than that obtained in the prior art method. Therefore, occurrence of signal jumps can be avoided and the frame flicker phenomenon on these spliced display units is alleviated, thereby improving the display effect.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A synchronous display method of a spliced display screen which comprises at least two spliced display units and at least two timing controllers respectively corresponding to the spliced display units, the method comprising steps of:
   receiving, by each timing controller, a timing control signal for a current frame of a spliced display unit corresponding to the timing controller, feedback from the corresponding spliced display unit;
   determining, by each timing controller, a phase difference between the timing control signal for the current frame of the corresponding spliced display unit and a reference timing control signal received by the timing controller;
   judging, by each timing controller, whether or not the phase difference goes beyond a predetermined threshold range;
   if it is judged that the phase difference goes beyond the predetermined threshold range, generating a phase adjustment value by the timing controller based on the phase difference, wherein the phase adjustment value is less than the phase difference;
   generating, by each timing controller, a next timing control signal for a next frame of the corresponding spliced display unit based on the phase adjustment value, so that a next phase difference between the next timing control signal for the next frame and the reference timing control signal is equal to the phase adjustment value; and
   outputting the generated next timing control signal for the next frame to the corresponding spliced display unit.

2. The synchronous display method of the spliced display screen according to claim 1, wherein the step of generating the phase adjustment value further comprises:
   obtaining the phase adjustment value by multiplying the phase difference by a predetermined coefficient which is greater than zero but less than 1.

3. The synchronous display method of the spliced display screen according to claim 1, further comprising:
   if it is judged that the phase difference is within the predetermined threshold range,
   directly generating, by each timing controller, the next timing control signal for the next frame of the corresponding spliced display unit, so that the next phase difference between the next timing control signal for the next frame and the reference timing control signal equals to the phase difference between the timing control signal for the current frame and the reference timing control signal; and
   outputting the generated next timing control signal to the corresponding spliced display unit.

4. The synchronous display method of the spliced display screen according to claim 1, wherein a timing control signal detection unit is disposed within a display panel in each spliced display unit, and wherein the step of receiving the timing control signal for the current frame further comprises:
   receiving, by each timing controller, the timing control signal for the current frame of the spliced display unit corresponding to the timing controller, feedback from the timing control signal detection unit disposed within the display panel of the corresponding spliced display unit.

5. A timing controller for use in a spliced display screen, the timing controller comprising:
   a receiving unit configured to receive a timing control signal for a current frame of a spliced display unit of the spliced display screen corresponding to the timing controller feedback from the spliced display unit, and a reference timing control signal;
   a first processing unit configured to determine a phase difference between the timing control signal for the current frame of the corresponding spliced display unit and the reference timing control signal received by the receiving unit;

a second processing unit configured to judge whether or not the phase difference goes beyond a predetermined threshold range;

a third processing unit configured to, if it is judged that the phase difference goes beyond the predetermined threshold range, generate a phase adjustment value based on the phase difference, wherein the phase adjustment value is less than the phase difference;

a fourth processing unit configured to generate a next timing control signal for a next frame of the corresponding spliced display unit based on the phase adjustment value, so that a next phase difference between the next timing control signal for the next frame and the reference timing control signal is equal to the phase adjustment value; and a sending unit configured to output the next timing control signal for the next frame to the corresponding spliced display unit.

6. The timing controller according to claim 5, wherein the third processing unit is further configured to, if it is judged that the phase difference goes beyond the predetermined threshold range, obtain the phase adjustment value by multiplying the phase difference by a predetermined coefficient which is greater than zero but less than 1.

7. The timing controller according to claim 5, wherein the fourth processing unit is further configured to, if it is judged that the phase difference is within the predetermined threshold range, directly generate the next timing control signal for the next frame of the corresponding spliced display unit, so that the next phase difference between the next timing control signal for the next frame and the reference timing control signal equals to the phase difference between the timing control signal for the current frame and the reference timing control signal.

8. A spliced display screen comprising at least two spliced display units, and at least two timing controllers according to claim 5, corresponding to the spliced display units respectively.

9. The spliced display screen according to claim 8, wherein a timing control signal detection unit is disposed within a display panel in each spliced display unit and is configured to detect the timing control signal for the current frame of the corresponding spliced display unit, and to send the timing control signal for the current frame of the corresponding spliced display unit to the corresponding timing controller.

10. The spliced display screen according to claim 9, wherein, in the each spliced display unit, the display panel comprises a transmittance region and a shading region, wherein the timing control signal detection unit is disposed in the shading region.

* * * * *